(12) United States Patent
Butterworth

(10) Patent No.: US 7,471,318 B2
(45) Date of Patent: Dec. 30, 2008

(54) FIRST-IN-FIRST-OUT INTERMEDIATE IMAGE STORAGE

(75) Inventor: Mark Melvin Butterworth, Santa Clara, CA (US)

(73) Assignee: Aptina Imaging Corporation, Grand Cayman (KY)

(*) Notice: Subject to any disclaimer, the term of this patent is extended or adjusted under 35 U.S.C. 154(b) by 735 days.

(21) Appl. No.: 10/948,505

(22) Filed: Sep. 23, 2004

(65) Prior Publication Data
US 2006/0061670 A1 Mar. 23, 2006

(51) Int. Cl.
*H04N 5/76* (2006.01)
(52) U.S. Cl. .................................. 348/231.99
(58) Field of Classification Search ............. 348/231.99
See application file for complete search history.

(56) References Cited

U.S. PATENT DOCUMENTS

| 6,282,462 | B1 |  | 8/2001 | Hopkins |  |
|---|---|---|---|---|---|
| 6,300,976 | B1 | * | 10/2001 | Fukuoka | 348/231.99 |
| 6,330,025 | B1 |  | 12/2001 | Arazi et al. |  |
| 2003/0117505 | A1 | * | 6/2003 | Sasaki et al. | 348/231.99 |
| 2004/0070679 | A1 | * | 4/2004 | Pope | 348/231.99 |
| 2004/0201716 | A1 | * | 10/2004 | Sakaegi | 348/220.1 |
| 2005/0212928 | A1 | * | 9/2005 | Classen et al. | 348/223.1 |

* cited by examiner

*Primary Examiner*—James M Hannett
(74) *Attorney, Agent, or Firm*—RatnerPrestia

(57) ABSTRACT

Images are captured within a camera. Upon preliminary image capturing being initiated, color balancing and autofocus is performed and a predetermined number of images are captured for storage in a first-in-first-out buffer. This is repeated until capture is terminated. Upon a final image capture being initiated, a first image is transferred from the first-in-first-out buffer to a long-term memory within the camera.

19 Claims, 5 Drawing Sheets

FIRST-IN-FIRST-OUT INTERMEDIATE IMAGE STORAGE

BACKGROUND

Digital cameras provide users a significant amount of versatility in capturing, storing, printing and transferring images. In order to capture an image, a user typically sets up and frames the picture using a viewfinder. Once the desired image is shown in the viewfinder, the user pushes a shutter button half-way down to signal the camera to perform an auto-focus. The user then continues pushing the shutter button all the way down signaling the camera to capture the picture. At this point, the camera performs functions such as color balancing. Once these functions have been performed, the image is captured. In the case where a flash is required, some delay in taking the picture may occur to allow the flash to charge.

The tasks performed by a camera after the shutter button is depressed and before the image is captured sometimes require a non-negligible amount of time. In some cases, the resultant delay in capturing an image can result in an ideal picture moment passing before the desired image is recorded. It is desirable, therefore, to find ways to make the recording of the image more contemporaneous with the depression of the shutter button.

SUMMARY OF THE INVENTION

In accordance with an embodiment of the present invention, images are captured within a camera. Upon preliminary image capturing being initiated, color balancing and auto-focus is performed and a predetermined number of images are captured for storage in a first-in-first-out buffer. This is repeated until capture is terminated. Upon a final image capture being initiated, a first image is transferred from the first-in-first-out buffer to a long-term memory within the camera.

DESCRIPTION OF THE EMBODIMENT

Figure 1:
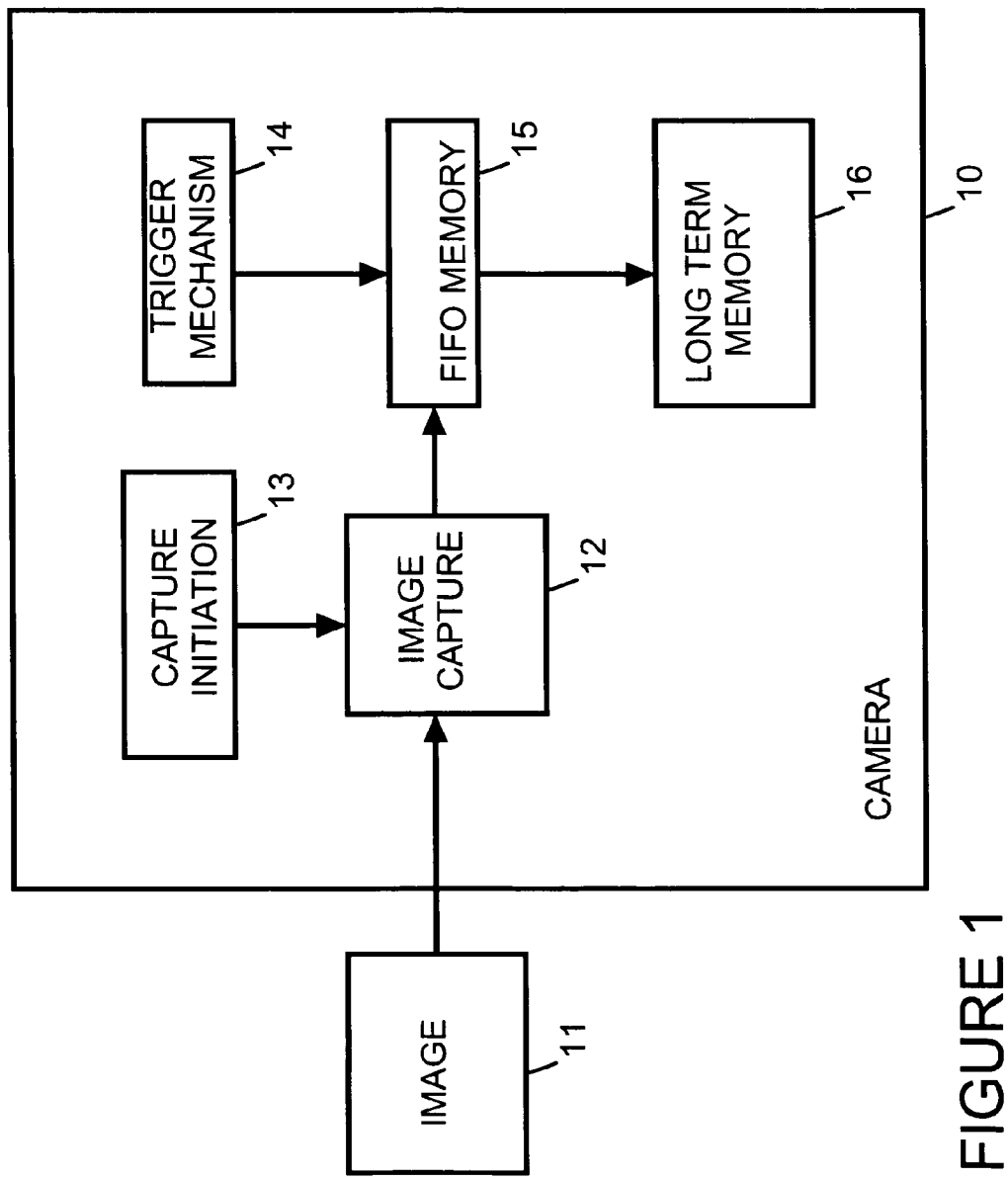
FIG. 1 is a simplified functional block diagram of a camera in accordance with an embodiment of the present invention.

FIG. 1 is a simplified functional block diagram of a camera 10. An image 11 is captured by an image capture block 12. Image capture block 12 includes, for example, lenses, a shutter, optical filters, motors that control the lenses, a charged coupled device (CCD) imager, an infrared focusing system, a microcontroller and/or other functional blocks typically associated with capturing images in digital cameras.

A capture initiation 13 directs image capture block 12 to begin capturing images. Each captured image is placed in a cyclic buffer arranged as a first-in-first-out (FIFO) memory 15. The maximum amount of images stored in FIFO memory 15 depends, for example, on the memory size of FIFO memory 15 and the memory size of captured images. For example, to store ten five-megabyte images requires FIFO memory 15 to have 50 megabytes of available storage. For example, to store one three-megabyte image requires FIFO memory 15 to have three megabytes of available storage.

A trigger mechanism 14 is used as a trigger to transfer one or more images within FIFO memory 15 to a long-term memory 16. For example, long-term memory 16 is implemented using typically available non-volatile picture storage for digital cameras. Example technologies include, for example, Microdrives, Memory Sticks, Smartmedia, xD Picture Cards, Compact Flash Cards, Multimedia MMC cards and so on.

In the simplest case, FIFO memory 15 stores only one image at a time. The image stored in FIFO memory 15 is transferred to long-term memory 16 upon activation of trigger mechanism 14. Alternatively, FIFO memory 15 stores multiple images and one or more images are selected from the contents of FIFO memory 15 to be transferred to long-term memory 16 upon activation of trigger mechanism 14. Selection is based, for example, on the image location within FIFO memory 15. Alternatively, selection is based on detected picture quality of images located within FIFO memory 15.

Capture initiation 13 and trigger mechanism 14 are part of user controls for camera 10. For example, capture initiation 13 and trigger mechanism 14 are each implemented using a separate button located on the case of camera 10. Alternatively, capture initiation 13 and trigger mechanism 14 are each implemented using the same button located on the case of camera 10.

In the case of one button used to implement capture initiation 13 and trigger mechanism 14, capture initiation 13 is activated when a user pushes the button one time and trigger mechanism 14 is activated when the user pushes the button a second time. Alternatively, capture initiation 13 is activated when a user pushes the button half way down and trigger mechanism 14 is activated when the user pushes the button all the way down.

Alternatively, capture initiation 13 is activated whenever camera 10 is in a picture taking mode and trigger mechanism 14 is activated when the user pushes a trigger activation button. In this case trigger mechanism 14 appears to the user to operate similar to a standard shutter button on the case of camera 10.

Figure 2:
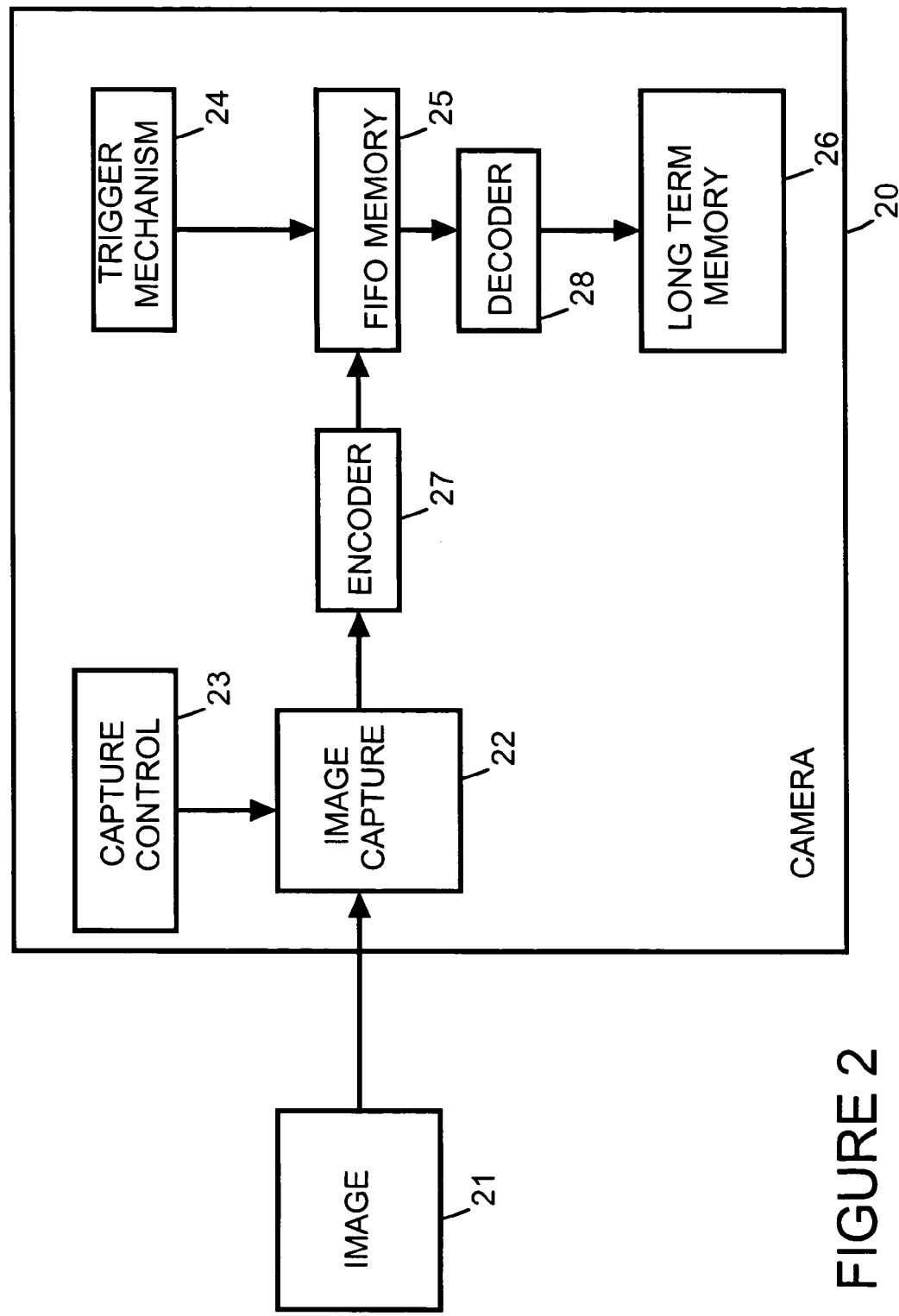
FIG. 2 is a simplified functional block diagram of a camera in accordance with another embodiment of the present invention.

FIG. 2 is an alternative simplified functional block diagram of a camera 20. An image 21 is captured by an image capture block 22. Image capture block 21 includes, for example, lenses, a shutter, optical filters, motors that control the lenses, a CCD imager, an infrared focusing system, a microcontroller and/or other functional blocks typically associated with capturing images in digital cameras.

Capture initiation block 23 directs image capture block 22 to begin capturing images. Each captured image is placed in a cyclic buffer arranged as a first-in-first-out (FIFO) memory 25. An encoder 27 encodes the images before placing the images in FIFO memory 25. The maximum amount of images stored in FIFO memory 25 depends, for example, on size of FIFO memory 25, the size of images captured and the encoding scheme used by encoder 27. For example, encode 27 encodes images using MPEG-4 or another encoding scheme.

A trigger mechanism 24 is used as a trigger to transfer one or more images within FIFO memory 25 to a long-term memory 26. For example, long-term memory 26 is implemented using typically available non-volatile picture storage for digital cameras. Decoder 28 is used to decode the selected image or images before transfer into long-term memory 26.

Figure 3:
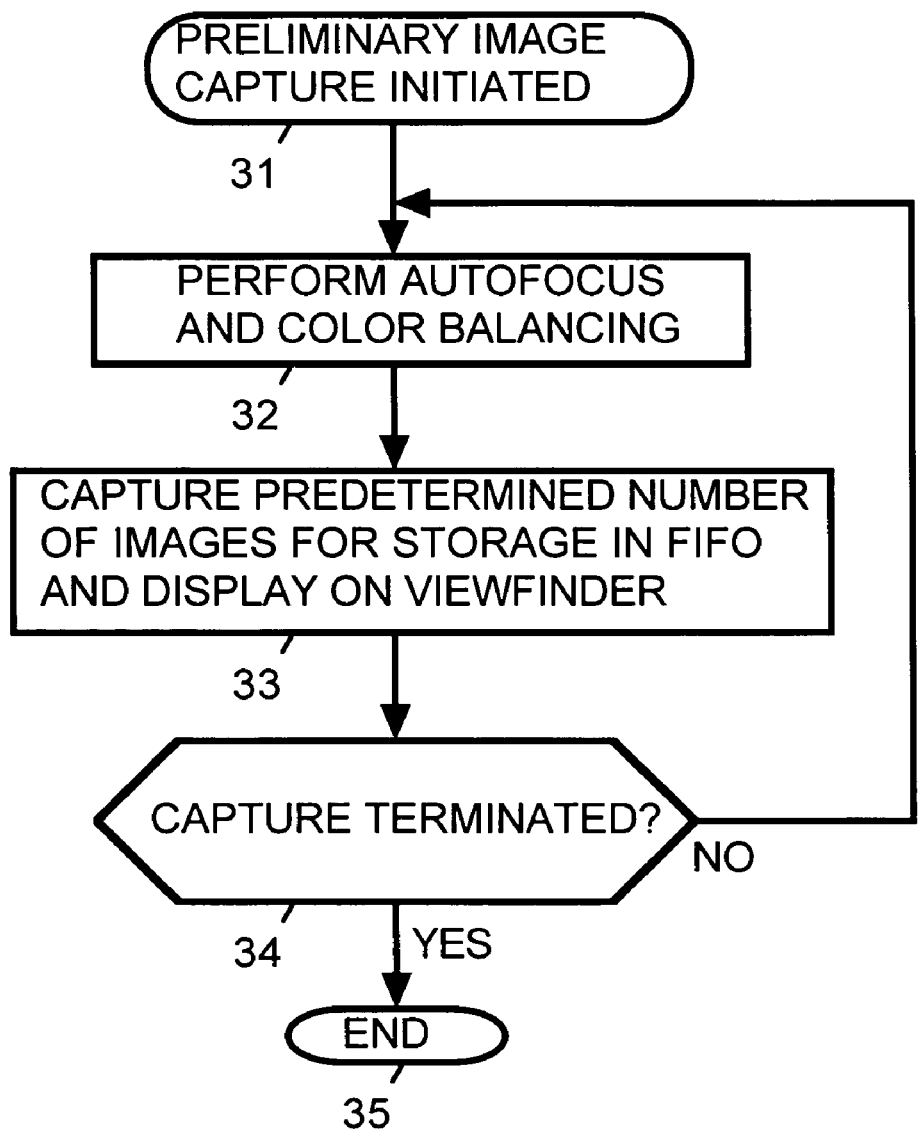
FIG. 3 is a simplified flowchart indicating camera operation after a preliminary image capture is initiated in accordance with an embodiment of the present invention.

FIG. 3 is a simplified flowchart indicating operation of camera 10 when a preliminary image capture is initiated. In a block 31, a preliminary capture is initiated by capture initiation block 13. In a block 32, auto-focusing is performed and color balancing is performed. Color balancing includes, for example, attaining white balance by adjusting the gain of the red, green and blue (RGB) channels within camera 10. Additionally, any other function needed for final picture taking is performed in block 32.

In block 33, a predetermined number of images are captured and placed in FIFO memory 15. If a viewfinder is used, each captured image can be shown on the viewfinder.

The number of images captured in block 33 can range from one to as many as can be captured before it is deemed desirable to re-perform auto-focus and color balancing. The predetermined number can be a fixed number for camera 10, can be user adjustable, or can be adjusted automatically by camera 10 depending upon a selected camera mode. When FIFO memory 15 is full, a newly captured image replaces an oldest image currently residing in FIFO memory 15.

In a block 34, a determination is made as to whether the capture is terminated. Depending upon the configuration of camera 10, capture is terminated, for example, by turning off camera 10, and/or by activating trigger mechanism 14.

When in block 34, the determination is made that capture is not terminated, in block 32, auto-focusing is again performed and color balancing is again performed. When in block 34 the determination is made that capture is terminated, in a block 35 the process is ended.

Figure 4:
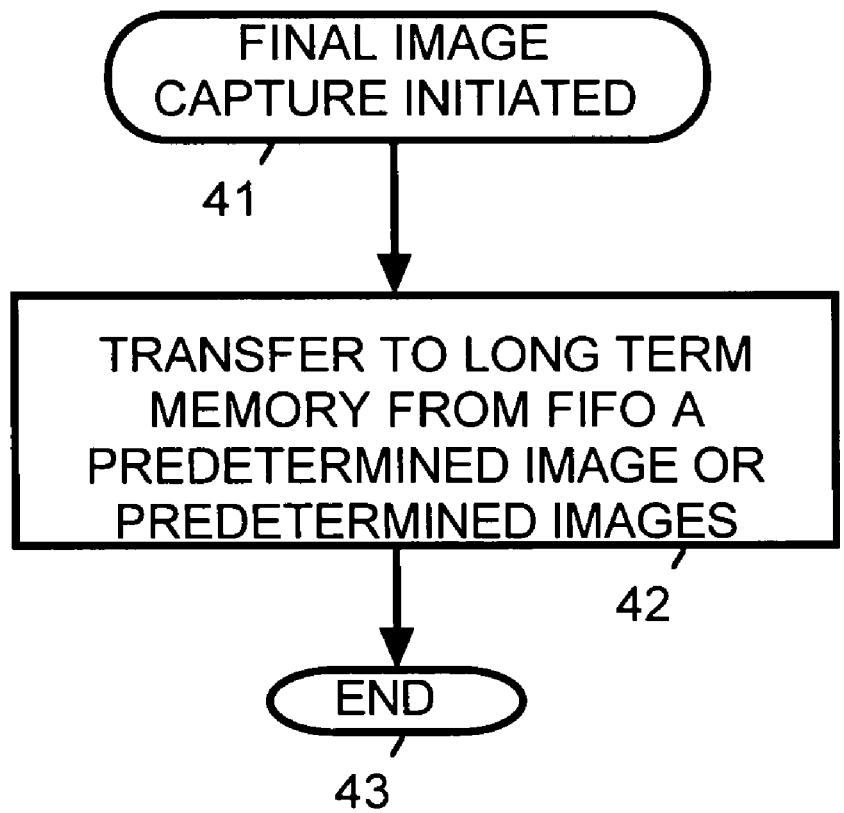
FIG. 4 is a simplified flowchart indicating camera operation after a final image capture is initiated in accordance with another embodiment of the present invention.

FIG. 4 is a simplified flowchart indicating operation of camera 10 after a final image capture is initiated. In a block 41, a final image capture is initiated by trigger mechanism 14. In a block 42, a predetermined image or predetermined images are transferred from FIFO memory 15 to long-term memory 16. For example, if bracketing is selected, some or all the images in FIFO memory 15 are transferred to long-term memory 16. In some embodiments of the present invention, additional images may be transferred to long-term memory 16 directly from image capture block 12.

When in a single image mode, for example, only a single image is transferred from FIFO memory 15 to long-term memory 16. For example, the last image placed in FIFO memory 15 is transferred to long-term memory 16. Alternatively, another selected image is sent from FIFO memory 15 to long-term memory 16. The location within FIFO memory 15 from which an image is selected affects the amount of time before trigger mechanism 14 is activated that the image stored in long-term memory 16 was initially recorded. Varying the location within FIFO memory 15 from which an image is selected allows camera 10 and/or a user to optimize for the user or picture setting the time that occurs between initial capture of a picture by camera 10 and the user activating trigger mechanism 14.

The location within FIFO memory 15 from which an image is selected can be automatically selected by camera 10, can be manually selected by the user, or can depend upon a current mode of camera 10.

Figure 5:
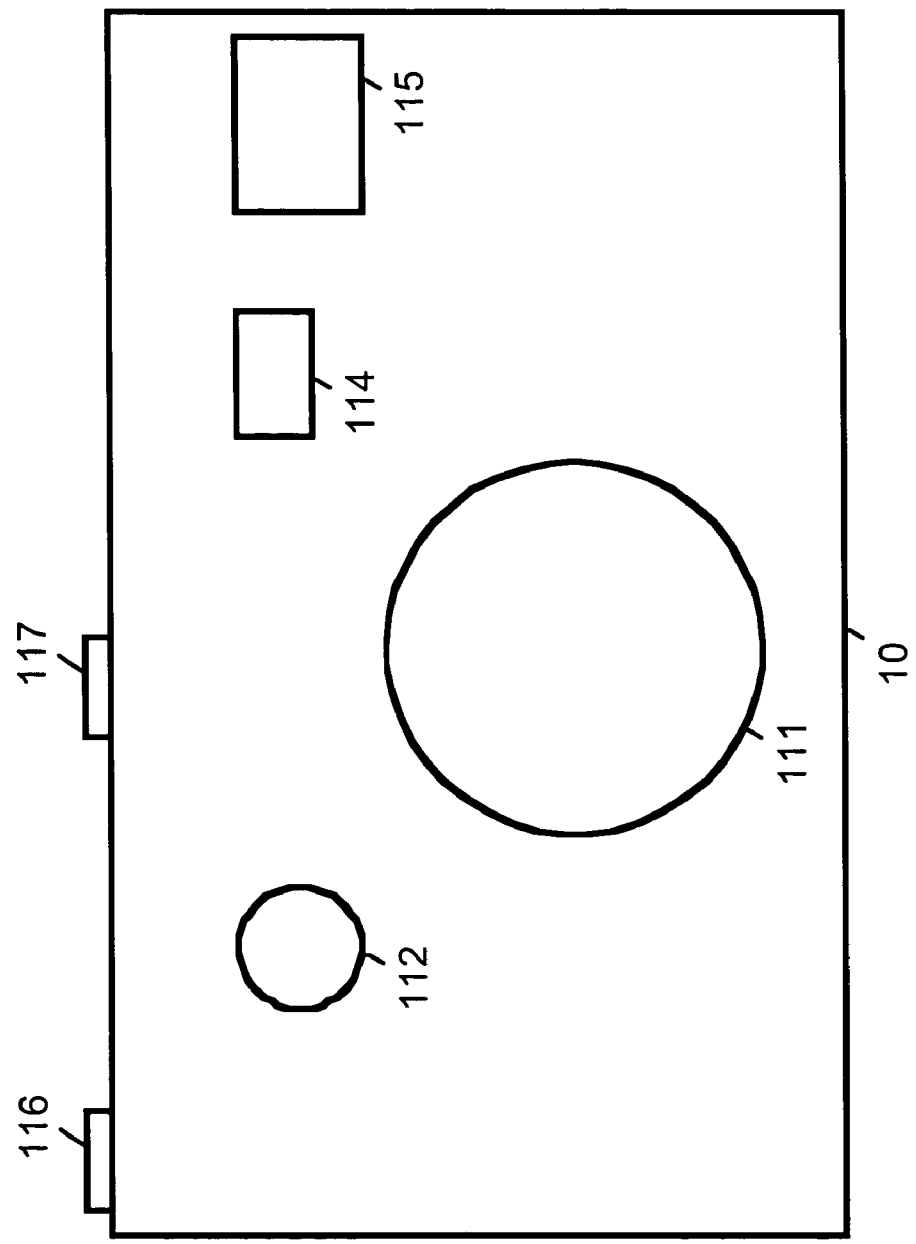
FIG. 5 is simplified front view of a camera that has a separate capture initiation and trigger mechanism in accordance with an embodiment of the present invention.

FIG. 5 is a simplified front view of camera 10. Camera 10 includes a color filter array 111 located behind the camera optics. Color filter array 111 includes sensors that capture images for processing by camera 10. Camera 10 includes other components such as a viewfinder intake 114 and a flash 115. A button 116 is part of trigger mechanism 14. Button 116 can also be used for capture initiation 13, as further described above. Alternatively, capture initiation 13 includes an optional button 117.

The present invention provides the user of a camera the opportunity to obtain a picture instantly, upon activating trigger mechanism 14. This is done without the necessity of camera 10 performing a lot of intermediate steps such as performing auto-focus and/or color balancing after a user "snaps" a picture. In the present invention, the image is actually recorded before the user activates trigger mechanism 14. Since a typical user of camera 10 is better able to recognize when a good picture has occurred than to predict when a good picture will occur, the recordation of an image before activation of trigger mechanism 14 is a significant advantage over prior art cameras.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for capturing an image within a camera, the method comprising:
   upon preliminary image capturing being initiated, repeating the following until capture is terminated:
   performing color balancing and auto-focus;
   capturing a predetermined number of images;
   storing the predetermined number of images in a first-in-first-out buffer; and
   upon a final image capture being initiated, performing the following:
   detecting a picture quality of each of the predetermined number of images stored in the first-in-first-out buffer;
   choosing one of the images stored in the first-in-first-out buffer based on the detected picture quality of the stored images; and
   transferring the chosen image from the first-in-first-out buffer to a long-term memory within the camera.

2. A method as in claim 1, wherein the chosen image is a last image stored in the first-in-first-out buffer.

3. A method as in claim 1, further comprising determining a location within the first-in-first-out buffer from which the chosen image is transferred to the long-term memory by selecting between an automatic mode in which the camera automatically chooses the location and a manual mode in which a user manually chooses the location.

4. A method as in claim 1, wherein upon the final image capture being initiated, additional images are transferred along with the chosen image from the first-in-first-out buffer to the long-term memory within the camera.

5. A method as in claim 1, wherein preliminary image capturing is initiated upon one of the following actions:
   a user turning on the camera;
   the camera being placed in a picture capturing mode; or
   the user depressing a button on the camera.

6. A method as in claim 1, wherein capturing the predetermined number of images includes encoding each image before storage of the respective image in the first-in-first-out buffer.

7. A camera comprising:
   an image capture mechanism;
   capture initiation mechanism that initiates capturing of images by the image capture mechanism;
   an intermediate buffer into which images captured by the image capture mechanism are initially stored;

long-term image storage; and a trigger mechanism, responsive to: (1) a selection between (i) an automatic mode in which an image of the initially stored images is chosen by the camera as a selected image, and (ii) a manual mode in which the same or a different image of the initially stored images is chosen by a user as the selected image, triggering a transfer of the selected image stored within the intermediate buffer to the long-term image storage, wherein when the intermediate buffer is full, images stored within the image capture mechanism are discarded in a first-in-first-out order to make room for new images, discarded images not being saved in the long-term image storage.

8. A camera as in claim 7, wherein the capture initiation mechanism includes a first button and the trigger mechanism include a second button.

9. A camera as in claim 7, wherein the capture initiation mechanism and the trigger mechanism are implemented to use a same button.

10. A camera as in claim 7, wherein the intermediate buffer can store only a single image.

11. A camera as in claim 7, wherein the selected image is a last image stored in the intermediate buffer.

12. A camera as in claim 7, additionally comprising:

an encoder that encodes the images captured by the image capture mechanism before the images are stored in the long-term image storage.

13. A camera as in claim 7, additionally comprising:

an encoder that encodes the images captured by the image capture mechanism before the images are stored in the intermediate buffer; and a decoder that decodes the selected image before the selected image is placed in the long-term image storage.

14. A camera comprising:

means for capturing images and placing the images in an intermediate buffer;

means for triggering, responsive to: (1) a selection between (i) an automatic mode in which an image of the images placed in the intermediate buffer is chosen by the camera as a selected image, and (ii) a manual mode in which the same or a different image of the images placed in the intermediate buffer is chosen by a user as the selected image, triggering a transfer of the selected image stored within the intermediate buffer to the long-term image storage; and means for discarding images within the intermediate buffer in a first-in-first-out order to make room for new images, discarded images not being saved in the long-term image storage.

15. A camera as in claim 14, wherein the intermediate buffer can store only a single image.

16. A camera as in claim 14, wherein the selected image is a last image stored in the intermediate buffer.

17. A camera as in claim 14, additionally comprising:

means for encoding the images captured by the means for capturing before the images are stored in the long-term image storage.

18. A camera as in claim 14, additionally comprising:

means for encoding the images captured by the means for capturing before the images are stored in the long-term image storage; and means for decoding the selected image before the selected image is placed in the long-term image storage.

19. A method as in claim 3, wherein responsive to the selection of the automatic mode, the camera selects the chosen image.

* * * * *